G. W. BEACH & C. VON CULIN.
DIRIGIBLE HEADLIGHT.
APPLICATION FILED JAN. 14, 1918.
1,290,051.
Patented Jan. 7, 1919.
4 SHEETS—SHEET 1.
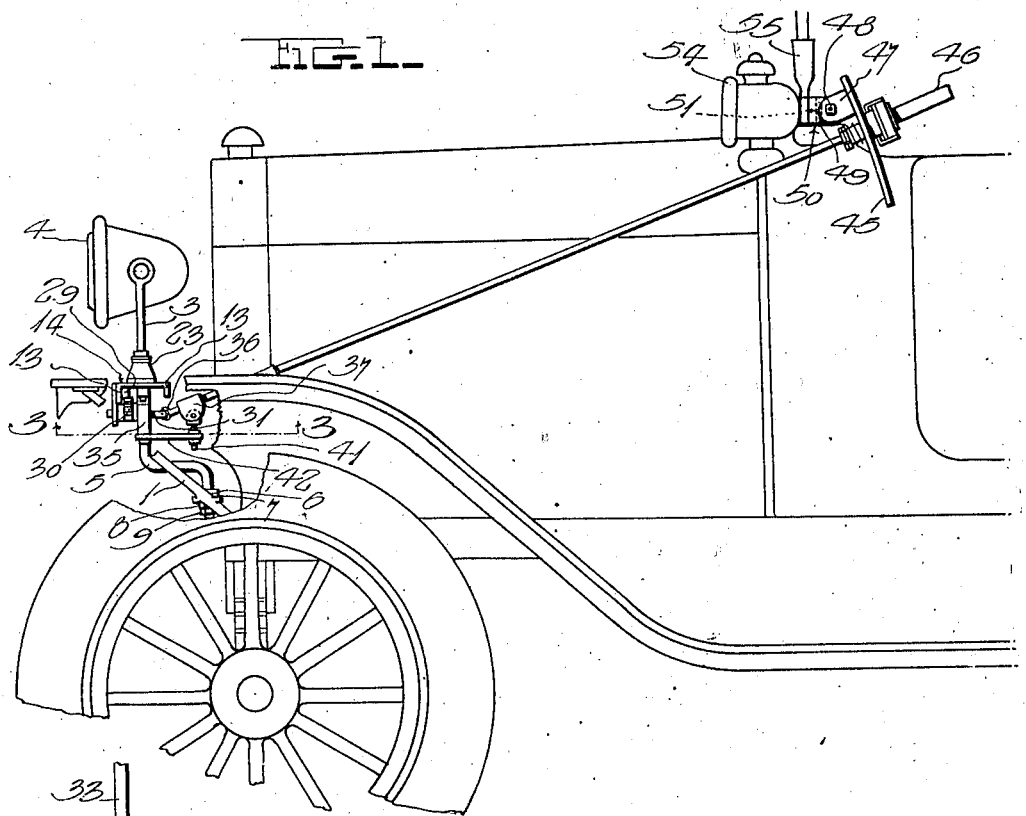
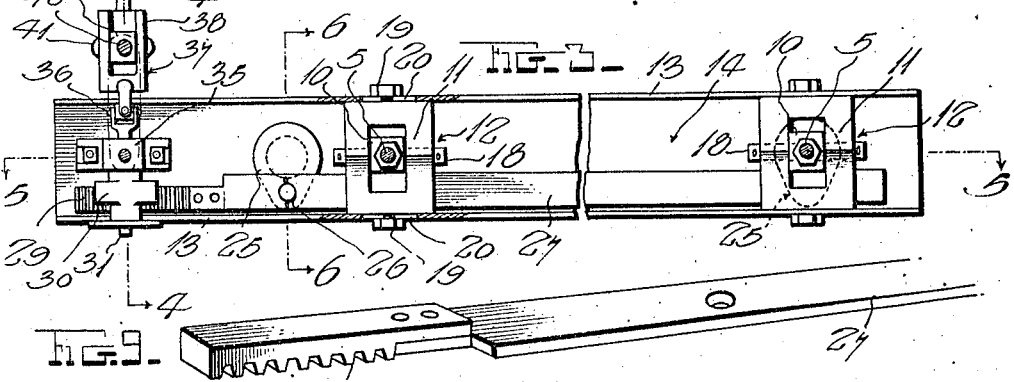
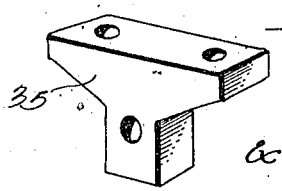
Witness
H. Woodard
Inventors
G. W. Beach
& C. Von Culin
By H. B. Wilson & Co.
Attorney

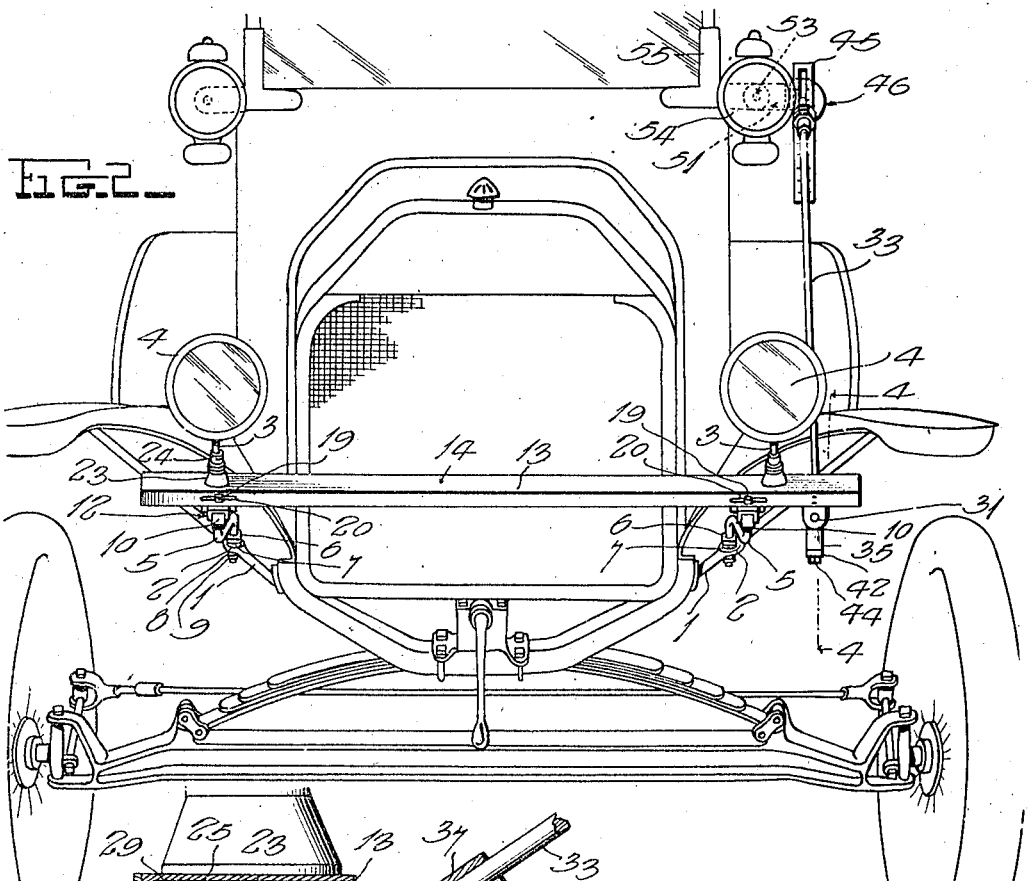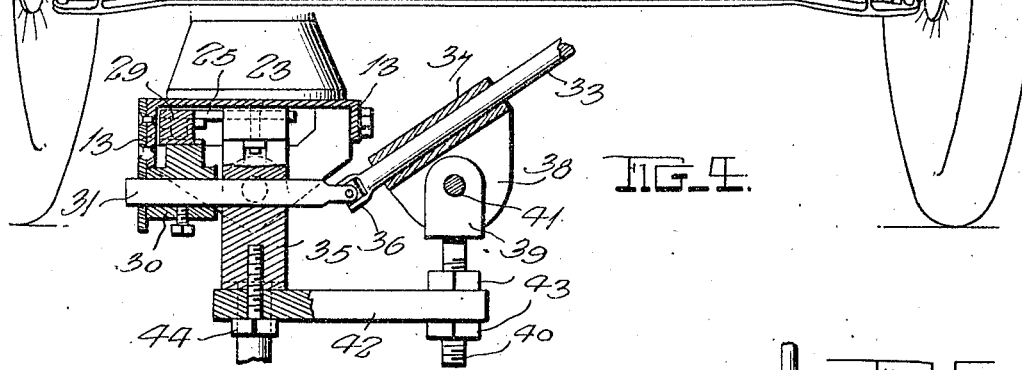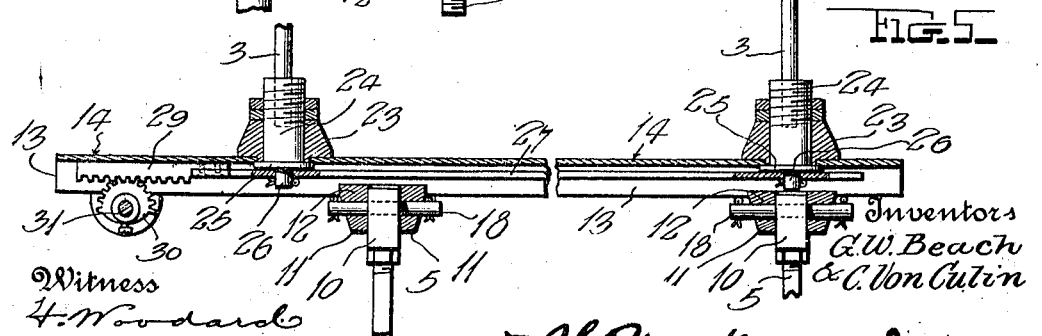

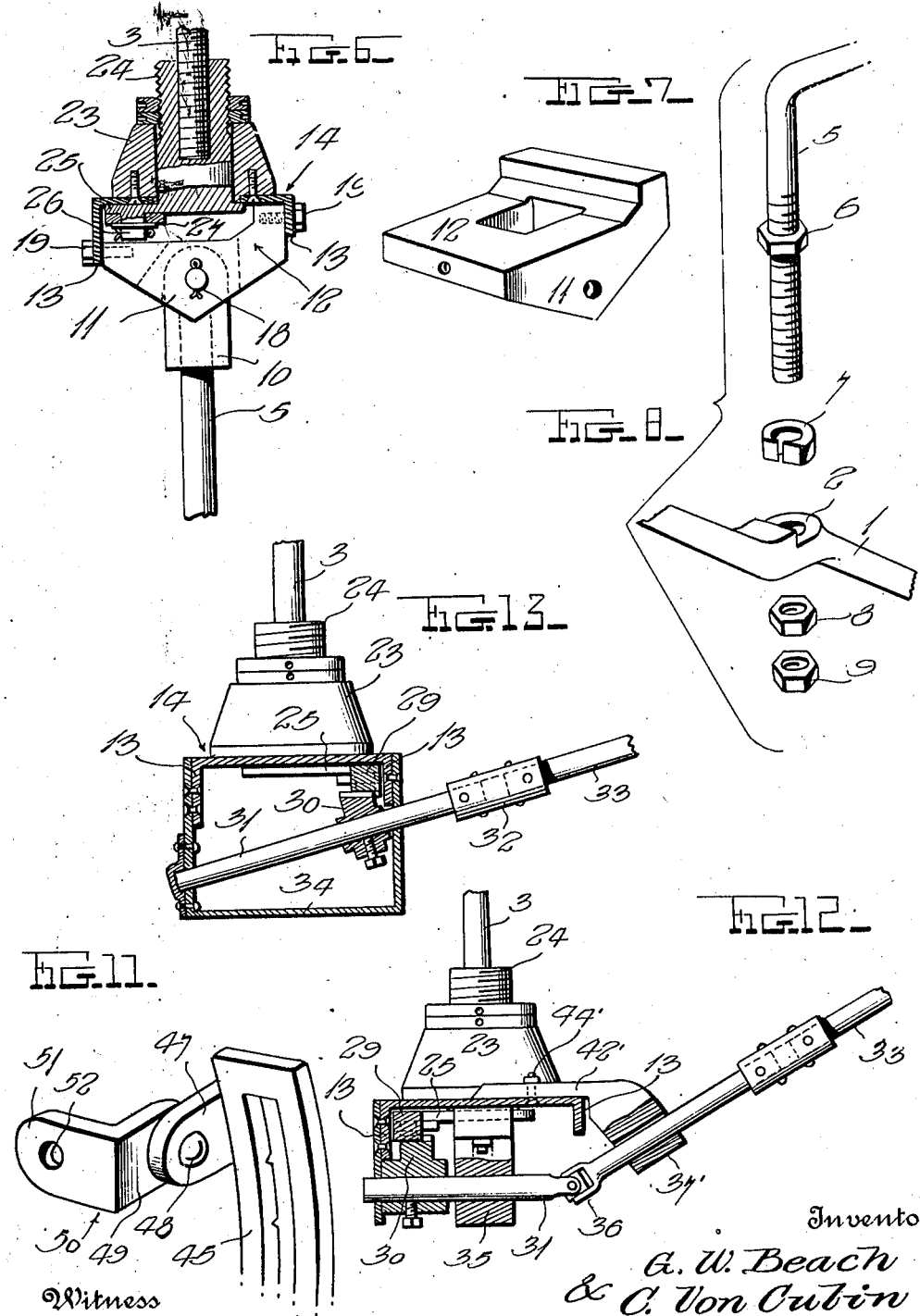

G. W. BEACH & C. VON CULIN.
DIRIGIBLE HEADLIGHT.
APPLICATION FILED JAN. 14, 1918.
1,290,051.
Patented Jan. 7, 1919.
4 SHEETS—SHEET 4.
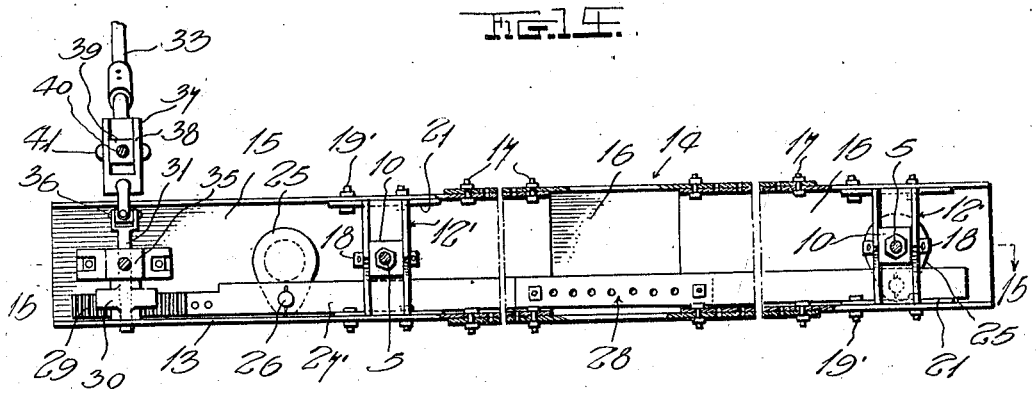
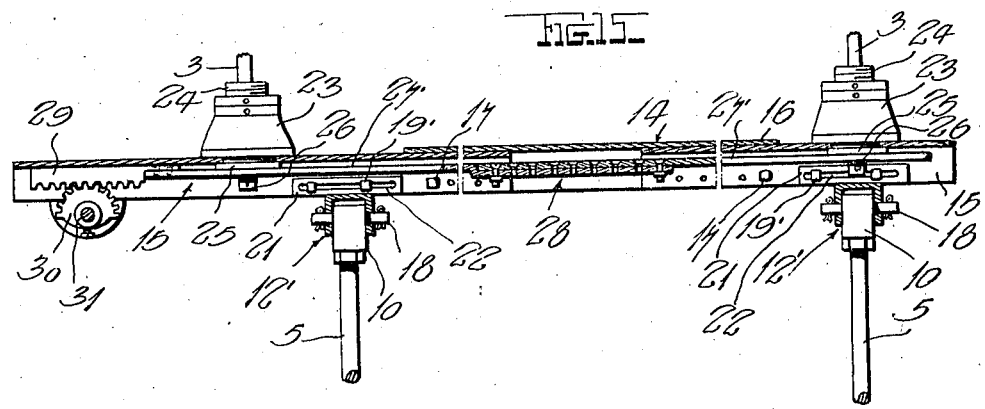
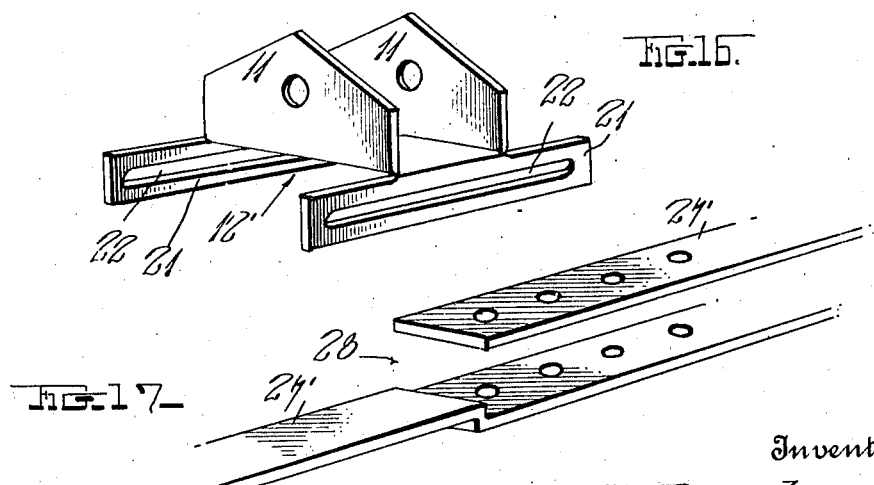
Witness
H. Woodard
Inventors
G. W. Beach
& C. Von Culin
By H. Q. Willson &co
Attorneys

UNITED STATES PATENT OFFICE.

GEORGE WATSON BEACH, OF SAYBROOK, CONNECTICUT, AND CLAYTON VON CULIN, OF NEW YORK, N. Y.

DIRIGIBLE HEADLIGHT.

1,290,051.   Specification of Letters Patent.   Patented Jan. 7, 1919.

Application filed January 14, 1918. Serial No. 211,860.

*To all whom it may concern:*

Be it known that we, GEORGE WATSON BEACH, a citizen of the United States, residing at Saybrook, in the county of Middlesex and State of Connecticut, and CLAYTON VON CULIN, a citizen of the United States, residing at New York, in the county of New York and State of New York, have invented certain new and useful Improvements in Dirigible Headlights; and we do declare the following to be a full, clear, and exact description of the invention, such as will enable others skilled in the art to which it appertains to make and use the same.

Our invention relates to improvements in dirigible headlights of the type which may be turned sidewise for throwing the rays of light to the sides of the road, or may be tilted upwardly and downwardly as occasion may demand; and the principal object is to so improve upon the general construction of devices of this class as to provide a device which may be easily and inexpensively manufactured, yet one which will be adaptable to numerous types of automobiles.

With the foregoing general object in view, the invention resides in the novel features of construction and unique combinations of parts to be hereinafter fully described and claimed, the descriptive matter being supplemented by the accompanying drawings which form a part of this specification and in which:

Figure 1 is a side elevation of an automobile partly broken away, showing the application of the invention;

Fig. 2 is substantially a front elevation of the machine and the invention applied thereto;

Fig. 3 is a horizontal section on the plane of the line 3—3 of Fig. 1 showing a bottom plan view of the tilting support of the headlights;

Fig. 4 is an enlarged transverse section on the plane of the line 4—4 of Figs. 2 and 3;

Fig. 5 is a longitudinal section of the device on the plane indicated by the line 5—5 of Fig. 3;

Fig. 6 is a vertical transverse section on the plane of the line 6—6 of Fig. 3 showing more particularly the manner of mounting the lower end of each headlight post and the method of supporting the tilting headlight support;

Fig. 7 is a perspective view of one of the bridge members which are instrumental in pivotally mounting the tilting support of the headlights;

Fig. 8 is a perspective view of one of the bracket arms which coöperate with said bridge members and the means of attaching these arms to the front fender brackets;

Fig. 9 is a perspective view of the operating bar for turning the headlight horizontally;

Fig. 10 is a perspective view of the bearing for the short shaft which is employed for shifting the operating bar longitudinally;

Fig. 11 is a perspective view of the guide for the rear end of the control shaft;

Fig. 12 is a view similar to Fig. 4 but showing a slightly different form of construction;

Fig. 13 is a view similar to Figs. 4 and 12, but showing still another form of construction;

Fig. 14 is a duplicate of Fig. 3 with the exception that it illustrates the tilting support and operating bar formed of a plurality of sections, and the bridge members constructed in a different manner;

Fig. 15 is a longitudinal section on the plane of line 15—15 of Fig. 14;

Fig. 16 is a perspective view of one of the bridge members shown in Figs. 14 and 15; and Fig. 17 is a detail perspective view showing the adjustable connection between the two sections of the operating bar of Figs. 14 and 15.

In the drawings above briefly described, the numerals 1 designate the front fender brackets of a well known type of automobile, said brackets having seats 2 upon which the vertical posts 3 of the headlights 4 are usually secured. Due to the nature of the present invention however these posts are removed and a pair of suitably shaped bracket arms 5 are secured at their rear ends in the seats 2. For so attaching the arms 5 to the seats 2, an upper nut 6, a washer 7, a lower nut 8 and a lock nut 9 are provided, the method of using these parts being clear from Fig. 8. It may here be explained that the arrangement just described is designed particularly for attaching the invention to the Ford automobile and that other appropriate arrangements will be employed for adapting the invention for use upon other makes of machines.

The front ends of the bracket arms 5 are provided with heads 10 received between ears 11 of a pair of cast bridge members 12 (Figs. 1 to 12) or a pair of sheet metal bridge members 12' such as those shown in Figs. 14, 15 and 16, either set of such bridge members being secured adjustably to the depending flanges 13 of a headlight support 14 extending transversely of the machine and formed either of one piece of channel metal as seen in Figs. 2, 3 and 5, or of two end sections 15 and a central section 16 adjustably connected at 17 (see Figs. 14 and 15). The construction last mentioned is intended to vary the length of the support 14 for cars of different widths. Regardless of its exact construction, the support 14 will be mounted for tilting by pivoting its ears 11 to the heads 10 as shown at 18.

When the cast bridge members 12 are employed, screws 19 are passed through slots 20 in the flanges 13 and threaded into the opposite ends of said bridge members so that the latter may be adjusted the required extent and then secured in that position. When the sheet metal bridge members 12' are employed, they are preferably provided with front and rear flanges 21 contacting with the inner sides of the flanges 13 and having longitudinal slots 22 through which bolts 19' pass for securing said flanges. By the provision of the slots 22 and bolts 19', it will be obvious that the bridge members 12' may be adjusted in addition to adjusting the several sections 15 and 16 of the support 14; and thus it is insured that the device shall be easily adapted to numerous makes of machines.

The upper side of the supporting member 14 is provided with a pair of suitably located bearings 23 in which vertical journals 24 are mounted, said journals carrying the posts 3 of the headlights 4 in any preferred manner. In most cases however we prefer to thread the posts into the journals as seen in Fig. 6. The lower ends of the journals 24 are provided with cranks 25 pivoted at 26 to an operating bar 27 located below the upper side of the support 14 and extending between its side flanges 13. This bar may either be constructed of one piece as shown for instance in Figs. 3 and 9, or of two sections 27' adjustably connected at 28 as disclosed in Figs. 14, 15 and 17. In cases where the support 14 is constructed at the factory in the proper length for any particular type of car, the operating bar 27 will be similarly constructed, but when the support 14 is to be adjustable to adapt it to numerous makes of machines, it is essential that the bar in question shall also be adjustable in some suitable manner such as that shown in the drawings.

Regardless of the exact formation of bar 27, one end of the latter will be provided with a rack bar 29 meshing with a segment 30 on the front end of a short operating shaft 31 which extends transversely of the support 14. In some instances, the shaft 31 may be inclined as shown at Fig. 13 and connected at 32 with a rearwardly extending control shaft 33, said shaft 31 being then preferably mounted in a U-shaped bracket 34 depending from the support 14 as shown in said figure. In most cases however the shaft 31 will be horizontal as seen for instance in Figs. 4 and 12, and in such cases this shaft will be mounted in a suitable bearing 35 depending from the tilting support and by preference constructed as detailed in Fig. 10. In these forms of the invention, the control shaft 33 is universally connected at 36 with the rear end of shaft 31 and the bearing 37 such as that detailed in Fig. 4 or such as that shown at 37' in Fig. 12 will be employed for the front end of said control shaft. When the bearing 37 is employed, it will preferably be provided with a pair of depending ears 38 straddling a head 39 on a vertical stem 40 and pivoted thereto at 41 on an axis substantially parallel with the support 14. Stem 40 passes through an opening in a horizontal arm 42 and may be adjusted in respect thereto by nuts or the like 43. A screw 44 or any equivalent device is provided for attaching the arm 42 to the lower end of bearing 35 and it will be obvious that loosening of this screw will permit the arm in question to swing horizontally as required to correctly position the rear end of the control shaft 33 so that the latter may be conveniently accessible to the driver. The vertical adjustability of the stem 40 also plays an important part in making such adjustment.

When the bearing 37' is employed, it is preferably provided with an integral horizontal arm 42' overlying the support 14 and connected thereto by a bolt or the like 44'. By releasing this bolt, the arm may be swung laterally to suitably adjust the control shaft 33 and tightening of the bolt will then hold the arm in adjusted position. The construction shown in Fig. 13 is used only when the complete headlight combination is so constructed at the factory as to render it applicable to any one make of machine, so that adjustment is not necessary when the device is applied to the car.

A vertically elongated guide 45 is employed for the rear end of the control shaft 33 and said shaft is provided with a suitable handle 46 for raising and lowering it, for turning it in either direction, and for securing it to the guide 45 after proper operation. This particular handle is covered by U. S. Patent No. 1,234,265 and forms no part of the present invention. The guide 45 however has been provided with an ear 47 extending from its inner edge parallel with the shaft 33, said ear being tightly pivoted at 48 to one of the arms 49 of a right angular attaching bracket 50, the other arm 51 of said bracket having an opening 52 to receive an attaching bolt 53. In the present showing, this bolt is the same one which is employed for securing one of the running lights 54 to its bracket 55, but we wish it understood that the bracket 50 could well be attached to any other suitable part of the machine.

In operation, the handle 46 may be released and either moved upwardly or downwardly to tilt the support 14, thus directing the rays of light from the headlight 4 either upwardly or downwardly as occasion may demand. Also, by turning the handle 46, the segment 30 will so shift rack bar 31 and the operating bar 27 as to turn the cranks 25, thus correspondingly turning the posts 3 and the lights 4, so that the rays from the latter will be thrown from side to side when making turns or for any other purpose.

Particular emphasis is laid upon the fact that the support 14 in all cases is formed easily and inexpensively, yet of extremely rigid construction by using channel metal. Furthermore, the flanges of this metal serve as housing means for the cranks 25 and their operating bar 27, as well as attaching means for the bridge members 12 and 12' which are located below the plane of movement of said operating bar and cranks. The use of the angle metal construction also permits very light material to be employed, yet when the edges of such material are bent downwardly to form the flanges 13, the latter and the bridge members secured thereto reinforce the support sufficiently to withstand all strain to which it is subjected.

Other features of importance are the adjustable bearings 37 and 37' for the control shaft 33 when the latter is universally connected to the shaft 31. The mounting of the guide 5 is also a rather salient feature and in fact practically all details above described are rather important. We wish it understood, however that since numerous minor changes may be made, we do not wish to be restricted to the features shown to any extent except as defined by the appended claims.

We claim:

1. A dirigible headlight combination comprising a transverse tilting support, a pair of headlights mounted on said support, an operating bar movable longitudinally of said support and operatively connected to said headlights for turning the latter when said bar is shifted longitudinally, a short shaft extending transversely of said support and operatively connected to said bar for moving the latter longitudinally, a bearing for said shaft secured to said support, a control shaft universally connected to said short shaft and extending rearwardly therefrom at an angle thereto, a bearing for said control shaft, a horizontally swinging arm extending rearwardly from said support and carrying said bearing, and means for securing said arm to said support.

2. A headlight combination comprising a tilting support and means for mounting it on the front of a vehicle, a shaft extending rearwardly from said support for tilting the same, and a headlight mounted on said support; together with a vertical guide for the rear end of said shaft, an ear extending from said guide in a direction parallel to said shaft, and an angular attaching bracket to one arm of which said ear is tightly pivoted.

In testimony whereof we have hereunto set our hands in the presence of two subscribing witnesses.

GEORGE WATSON BEACH.
CLAYTON VON CULIN.

Witnesses:
FREDERICK B. BLACKMAN,
GUY D. NUNN.